United States Patent [19]
Archer

[11] 3,768,775
[45] Oct. 30, 1973

[54] PORTABLE VALVE ACTUATOR
[75] Inventor: Monte B. Archer, Vacaville, Calif.
[73] Assignee: Clarence Ver Vaecke, Vacaville, Calif. ; a part interest
[22] Filed: Feb. 24, 1972
[21] Appl. No.: 229,059

[52] U.S. Cl.................... 251/230, 251/291, 81/56
[51] Int. Cl............................................ F16k 37/00
[58] Field of Search.................. 251/230, 291, 292, 251/293; 81/54, 55, 56

[56] References Cited
UNITED STATES PATENTS
| | | | |
|---|---|---|---|
| 975,292 | 11/1910 | Schramm | 251/292 X |
| 1,569,644 | 1/1926 | Taylor | 251/292 |
| 2,775,912 | 1/1957 | Skage | 81/55 |
| 3,277,749 | 10/1966 | Osburn et al. | 81/55 X |
| 3,468,198 | 9/1969 | De Maio | 81/55 |

*Primary Examiner*—Martin P. Schwadron
*Assistant Examiner*—David R. Matthews
*Attorney*—Stephen S. Townsend et al.

[57] ABSTRACT

A portable valve actuator for turning hard to operate valve stems such as found on valves buried in the ground. The operator has a yoke that is placed over the valve and engages sides of the valve body. A demountable power drive unit is mounted to the yoke and actuates a socket releasably engaged with the valve stem. The operator can be used with valves of different sizes in an upright or a horizontal position.

23 Claims, 11 Drawing Figures

Patented Oct. 30, 1973
3,768,775
2 Sheets-Sheet 1
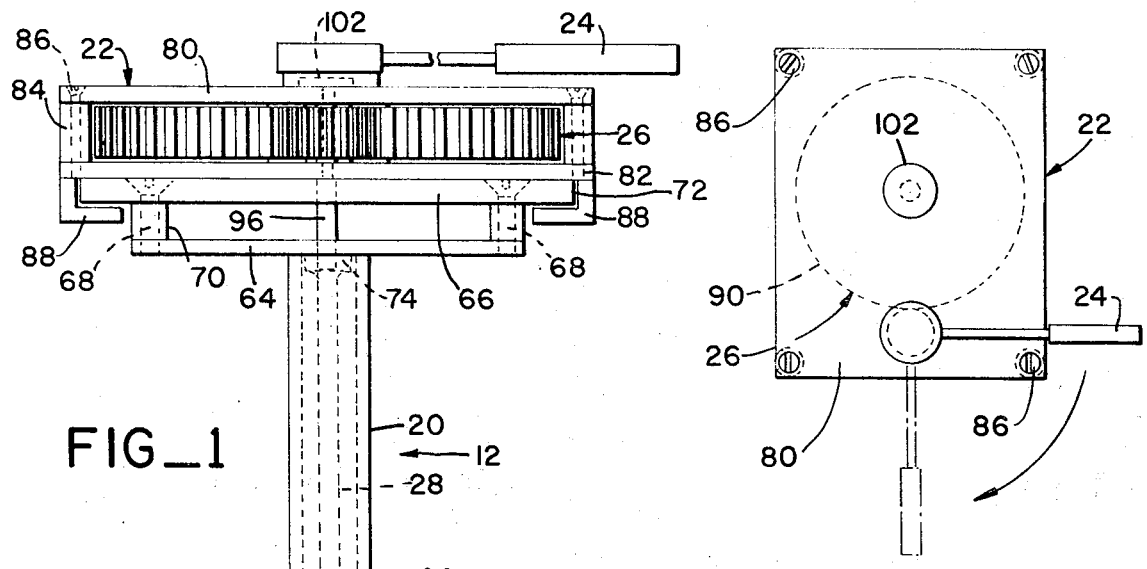
FIG_1
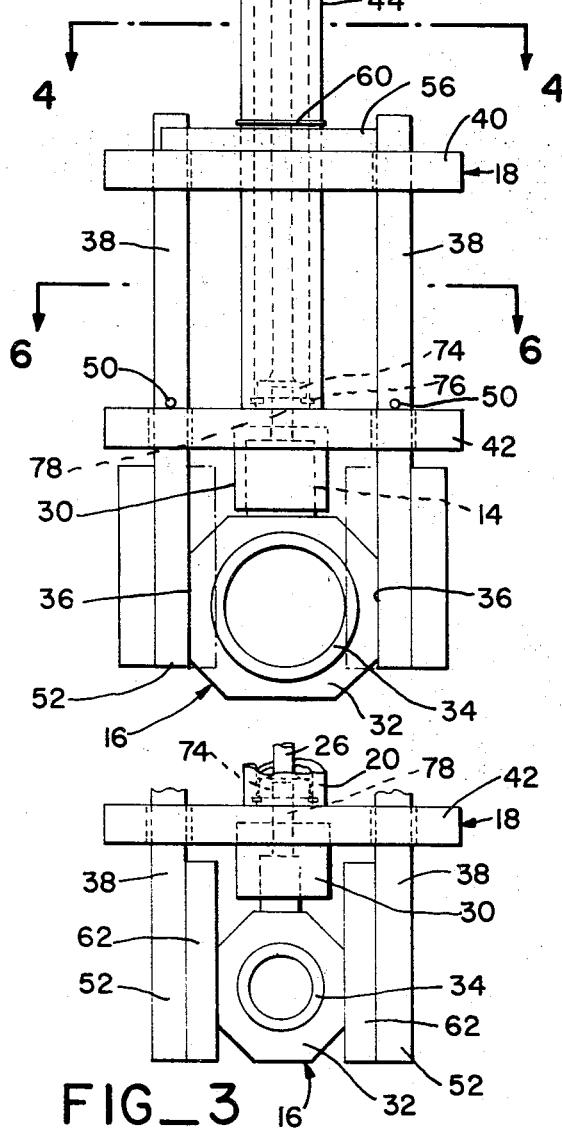
FIG_2
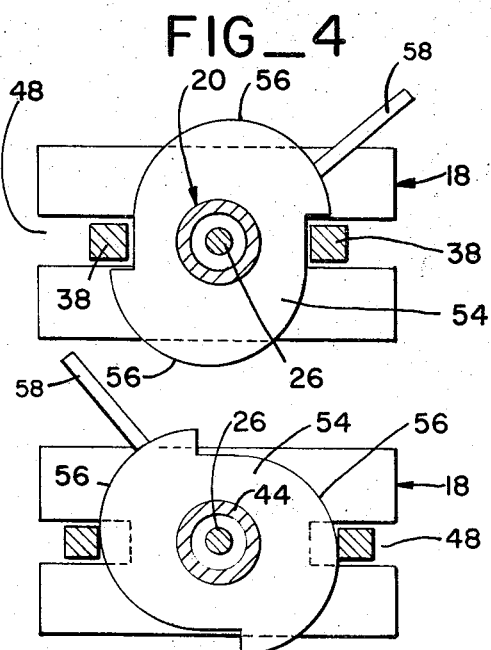
FIG_4
FIG_5
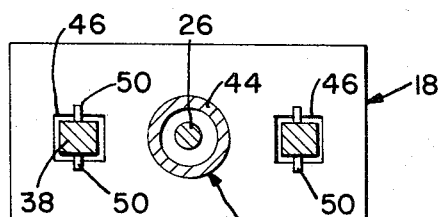
FIG_3
FIG_6

Patented Oct. 30, 1973
3,768,775
2 Sheets-Sheet 2
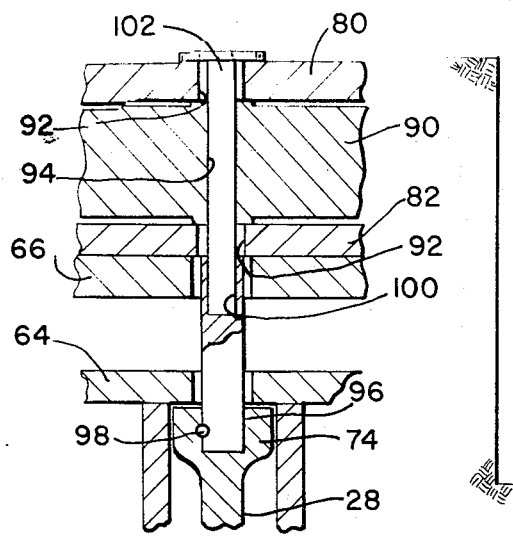
FIG_7
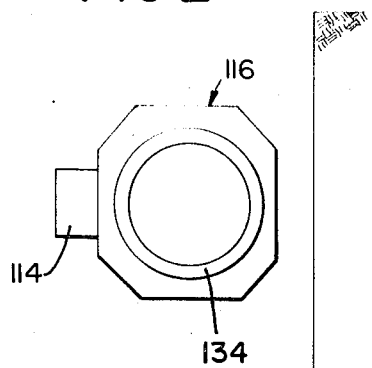
FIG_8
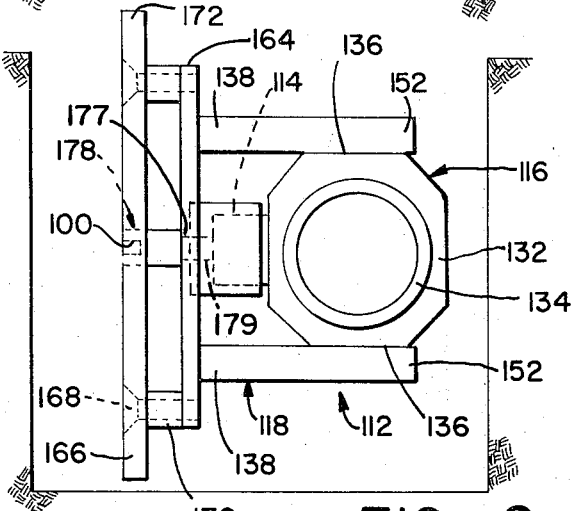
FIG_9
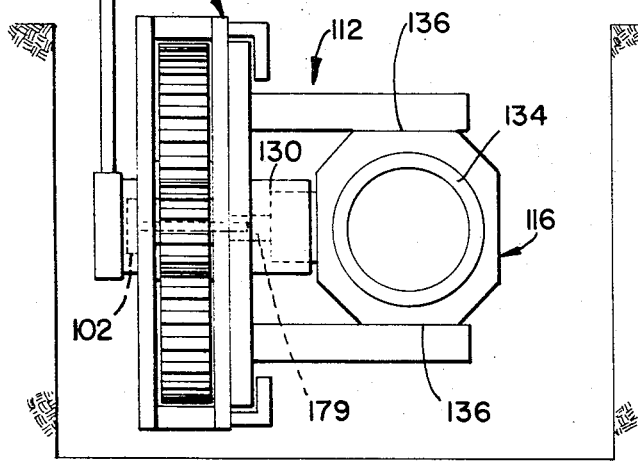
FIG_10
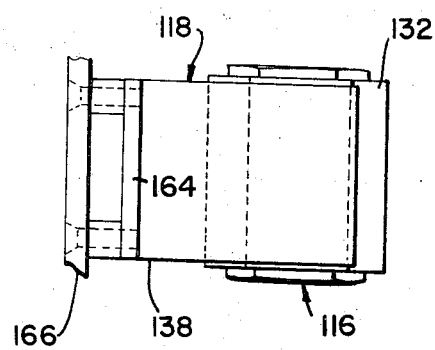
FIG_11

PORTABLE VALVE ACTUATOR

BRIEF DESCRIPTION OF THE PRIOR ART

Various valve operators are known. Usually such operators are hand wheel or motor operated and fixedly mounted to the valve. It is also known to provide portable valve actuators. U.S. Pat. No. 1,815,755 (Armstrong) describes a removable valve wrench for use with ground buried valves. In the Armstrong patent as well as in all other instances known to the inventor, such valve operators primarily provide access to the valve beneath the ground and an extended lever arm so that a person can open or close the valve.

Ground buried valves, such as found in gas and water distribution systems, are either never operated or they are operated at time intervals that may be as long as several years. Such extended lack of operation has a tendency to bind the valve stem due to accumulating deposits, silt, corrosion and the like in the valve interior. Thus, very high torques must be applied to turn the stem.

Application of the necessary stem operating torque results in a substantial force that tends to rotate the whole valve body. Valve body rotation is prevented solely by the pipes that extend from the valve. Thus, as the required torque to operate the valve increases the valve rotating force increases similarly. Eventually it will become excessive and damage or break the pipes, particularly when the pipes are constructed of relatively low-strength plastic materials or of brittle metal castings. Damage to the pipe requires extensive repair work and is costly.

SUMMARY OF THE INVENTION

The present invention provides a portable valve operator particularly suited for turning hard to turn stems such as found in ground buried valves of communal gas and water distribution systems. The operator can be adjusted for use with valves of different sizes, can be used on valves buried in the ground as well as on side-mounted valves, and is constructed so that the stem operating torque is not transmitted to the pipes extending from the valve body.

Broadly speaking, a valve operator constructed in accordance with the invention comprises a yoke constructed of a pair of opposing, spaced apart members for placement against and engagement of opposite sides of the valve body. One or more plates or the like interconnect portions of the members extending beyond, e.g., above, and across the valve body and the valve stem. A socket for engaging the valve stem is carried by the yoke. A power drive is rigidly connected to the yoke and the socket for turning the socket, and therewith, the stem.

In one embodiment of the invention the plate defines a flange and the members are rigidly secured to a flange. The drive unit is mounted to the flange closely adjacent the stem drive socket. This operator is particularly adapted for actuating stems of buried, side-mounted valves. The drive unit is demountable from the flange. A plurality of differently sized rigid yokes are provided each for use with a valve of different size and/or configuration.

In another embodiment of the invention the valve body engaging members are pivotally secured to plates. Adjacent the end of the members and spaced above the valve is a cam or the like that spreads the members apart. The lower ends of the members are thereby firmly engaged with the valve body. A tubular extension is mounted to at least one of the plates and terminates in a flange which in turn demountably connects to the drive unit. A drive bar is rotatably disposed within the tubular member and can be connected with the drive unit and the stem socket.

In both instances, the drive unit comprises a reduction drive such as a reduction gear for developing the necessary high torque. A relatively small operating handle is included. The only forces transmitted to the pipes extending from the valve body is the moment applied to the reduction drive actuating handle. The large torque generated by the drive is transmitted to the valve body via the drive bar to the socket and the stem. From the body it is then transmitted back to the drive unit via the body grasping members, the tubular member and the flange mounted thereto. These large forces, therefore, are isolated from the pipes extending from the valve. Damage to the pipes and costly repairs are thereby eliminated even though the valve might require very high operating torques.

The portable operator of the present invention is relatively compact and lightweight and is easily hand-carried and placed on the valve in the field. It is of a simple construction, employs only standard components and is therefore inexpensive. It does provide an ideal answer to the problem of operating infrequently operated valves without endangering the pipes to which the valve is connected.

BRIEF DESCRIPTION OF THE DRAWINGS

FIG. 1 is a front elevational view of one embodiment of a portable valve actuator constructed in accordance with the invention;

FIG. 2 is a plan view of the operator illustrated in FIG. 1;

FIG. 3 is a fragmentary front elevational view of the bottom end of the operator shown in FIG. 1 and illustrates the use of the operator on a valve of a different size;

FIG. 4 is a cross-sectional plan view and is taken on line 4—4 of FIG. 1;

FIG. 5 is a cross-sectional plan view similar to FIG. 4 but illustrates the manner in which the operator grasps the valve body;

FIG. 6 is a cross-sectional plan view taken on line 6—6 of FIG. 1;

FIG. 7 is an enlarged, fragmentary front elevational view, in section, of the drive unit of the operator shown in FIG. 1 and the connection of the drive unit to the operator yoke;

FIG. 8 is a front elevational view of a side-mounted valve buried in the ground;

FIG. 9 is a view similar to FIG. 8 and illustrates another embodiment of the valve operator of the present invention;

FIG. 10 illustrates connection of the drive unit to the valve operator shown in FIG. 9; and FIG. 11 is a plan view of the valve shown in FIG. 9.

DESCRIPTION OF THE PREFERRED EMBODIMENTS

Referring to FIGS. 1–6, in one preferred embodiment of the invention a portable valve actuator 12 for operating a stem 14 of a valve 16 broadly comprises a yoke 18, an extension 20 disposed on top of the yoke and a power drive unit 22 demountably secured to the extension. A ratchet handle 24 is provided for actuating the power drive unit. The moment exerted on the handle is amplified by a reduction gear drive 26 of the drive unit and is transmitted via a drive bar 28 disposed within extension 20 to a stem engaging socket 30.

To prevent the torque exerted on the stem 14 from turning valve body 32 and thus straining pipes 34 extending from the body, yoke 18 is placed over and grasps sides 36 of the body. A torque applied to the stem is thus transmitted to the valve body and hence to yoke 18. When applied to a valve the portable valve actuator 12 of the present invention takes up all torques generated within itself without transmission to the pipes. Pipe damage or breakage is thereby prevented. The only forces to which the actuator of the invention subjects the pipes is the relatively minor moment applied to ratchet handle 24.

Turning now to the detailed construction of the actuator, yoke 18 is defined by a pair of spaced apart, opposite elongate bar members 38 which are retained to a pair of vertically spaced plates 40, 42 rigidly secured to a lower end of a tube 44 defining the extension 20. The bar members have a square or rectangular cross section, they are preferably constructed of conventional steel bar stock, and they are disposed in slightly oversized apertures 46 of lower plate 42 which are aligned with outwardly opening slots 48 of upper plate 40. Pins 50 or the like retain the bar members to plate 42 to prevent the bar members from accidentally disengaging the plates.

Bar members 38 extend sufficiently below lower plate 42 so that lower ends 52 of the members extend over the full vertical height of sides 36 of the valve body. A rotatable cam 54 is mounted on top of upper plate 40 and has two cam surfaces 56 which are shaped to permit bar members 38 to be disposed adjacent the innermost end of slots 48 (shown in FIG. 4) or at a position in which the upper ends of the bar members are spread apart to about the position shown in FIG. 5. A handle 58 is provided for rotating the cam and a retaining ring 60 positions the cam closely adjacent the upper sides of plate 40.

When the cam is roated, as from the position shown in FIG. 4 to the position shown in FIG. 5, the bar members pivot about horizontal axes which are located in the vicinity of apertures 46 and lower plates 42. The pivotal movement of the bar members moves lower ends 52 in the opposite direction from the movement of the upper end of the bar members towards or away from each other. The lower end of the bar members can thereby be repositioned to take up variations in valve body dimensions and to adapt the yoke for engaging valve bodies of different size valves.

To increase the range of valves for which the yoke can be adapted, pads 62 are secured to the lower end of the bar members. The pads preferably have a thickness of about one-half inch. For use of the yoke with large size valves, say a 2 inch gas valve, the bar members are positioned as shown in FIG. 1 with pads 62 facing outwardly. To use the same yoke on a 1 ½ inch valve, the bar members are removed from plates 40, 42 by removing retaining pins 50 and the members are reinserted with pads 62 facing inwardly as illustrated in FIG. 3. In most of these uses, cam handle 58 can be rotated in a counterclockwise direction, as viewed in FIG. 4 to firmly engage the bar member or pads, respectively, with the valve body sides and to thus take up dimensional tolerances. Using the operator on a yet smaller size valve, say a 1 inch valve, the bar members remain in the position as for use in a 1 ½ inch valve (FIG. 3) but cam 56 is rotated counterclockwise, as viewed in FIG. 4, until the pads are sufficiently moved inwardly to engage the valve body sides. Thus, yoke 18 is adapted for use with differently sized valves and particularly for use with the valve sizes commonly encountered on communal gas and water distribution systems.

Still referring to FIGS. 1–6, tube 44 of extension 20 has a sufficient length so that it extends above ground when yoke 18 is engaged with the valve to be operated. A disc 64 is rigidly secured to the upper end of the yoke. A rectangular flange 66 is preferably demountably secured to the disc with bolts 68. Spacers 70 space the flange from the disc. For purposes to be described hereinafter, flange 66 includes at least one pair of spaced apart, parallel edges 72 which extend outwardly beyond the spacers and disc.

Drive bar 28 is mounted interiorly of tube 44 and includes upper and lower end sockets 74. The upper socket is disposed immediately below disc 64. The end face of the lower socket is in the vicinity of plate 42 and is engaged by a conventional spring retaining ring 76 which retains the drive bar within the tube and prevents axial movements of the bar. The sockets of the drive bar have a diameter slightly less than the inner diameter of tube 44 so that the tube acts as a journal for them. A lubricant or the like can be placed within tube 44 to keep the sockets lubricated and prevent high friction and/or wear at the contact points between the rotatable drive shaft, the disc, the tube and the retaining ring.

Socket 30 which drives stem 14 is demountably secured to the lower end of the drive bar with a lower drive pin 78. The drive pin has a conventional, e.g., square, cross section and includes spring-loaded balls (not shown) so that it retains itself to the socket in the lower end of the drive bar and so that it retains the stem driving socket while permitting it to be disengaged from both. The stem drive socket is readily replaced for use with differently sized valves.

Referring now to FIGS. 1, 2 and 7, the reduction gear drive 26 of power drive unit 22 is retained between a pair of spaced apart upper and lower plates 80 and 82, respectively. Spacers 84 maintain the plates at the desired distance and threaded bolts 86 firmly secure the plates to each other. The lower plate includes a pair of parallel, spaced apart U-shaped channels 88 which are dimensioned so that they can be slipped over edges 72 of yoke flange 62. In this manner, the power drive unit can be retained to the yoke.

A driven gear 90 of the reduction drive has a hub journal in aligned apertures 92 of plates 80, 82 and a square axial bore 94.

An upper drive pin 96 engages upper drive bar socket 74 and is retained thereto with a spring-loaded ball 98. The drive pin extends upwardly from socket 74 and terminates just below the upper surface of yoke flange 66. Its upper end includes a square recess 100 dimensioned to receive a drop pin 102 which in turn fits snugly in square bore 94 of the driven gear.

In use, power drive unit 22 is secured to flange 66 by removing drop pin 102 and slideably engaging flange edges 72 with channels 88 until square bore 94 in driven gear 90 is aligned with upper drive pin 96. The drop pin is then inserted and engaged with recess 100 in the upper drive pin. Thereafter, drive bar 28 is coupled to the driven gear. To facilitate alignment suitable stops (not separately shown) can be provided. Drop pin 102 also prevents accidental disengagement or relative motion between flange 66 and power drive unit 22.

The above-described construction of the connection between the power drive unit and the flange maintains the power drive unit separate from the remainder of the valve actuator of the present invention. This substantially economizes the construction of actuators and enables the use of the drive unit with another embodiment of the valve actuator of the present invention as described hereinafter.

Referring now to FIGS. 8-11, the embodiment of the operator illustrated in FIGS. 1-6 is not well adapted for use with buried, side-mounted valves 116 in which a stem 114 is horizontally oriented because extension 20 will usually be relatively long. For such applications, the present invention provides a valve actuator 112 which can be used with power drive unit 22, the construction of which is described in detail above. The actuator 112 broadly comprises only a yoke 118, and, demountably secured thereto, the power drive unit 22.

Yoke 118 is defined by a pair of spaced apart, opposite bar members 138 which are rigidly secured, e.g., welded to one side of the disc 164. The spacing between the bar members corresponds to the spacing between sides 136 of a particular valve body 132. Thus, one yoke is provided for each valve size. To change actuator 112 for use with differently sized valves, yoke 118 is replaced.

A flange 166, identical to flange 66 shown in FIGS. 1-7, is spaced from disc 164 with spacers 170 and secured thereto with bolts 168. Flange 166 defines edges 172 which are identically constructed to edges 72 shown in FIGS. 1-7 so that power drive unit 22 can be mounted on and used with valve actuator 112 shown in FIGS. 8-11.

A drive pin 178 is disposed between disc 164 and flange 166 and is retained thereto with a retaining ring (not shown) or the like. The drive pin includes a recess 100 and a shoulder 177 that rests on disc 164. A square drive 179 extends through disc 164 and is dimensioned for engaging a correspondingly square aperture in socket 130. As before, a spring-loaded ball (not shown) removably retains the socket to the square drive of the drive pin.

Actuator 112 is used by connecting drive unit 22 to yoke 118 and slipping it horizontally over side-mounted valve 116 so that ratchet 24 extends upwardly. When bar members 138 engage sides 136 of valve body 132 the ratchet can be operated. Rotation of driven gear 90 is thereby transmitted to valve stem 114 without transmission of the torque to pipes 134 extending from the valve.

Thus, the valve operator of the present invention can be employed with horizontally or side-mounted valves as well as with upright mounted valves in the ground. The additional cost for providing this adaptability, namely the cost of constructing the different sized yokes 118, is small since the main cost items, namely the adjustable yoke 18 and the power drive unit 22 are interchangeable.

I claim:

1. A portable valve actuator for turning a valve stem without transmitting large forces to pipes extending from a body of the valve, the actuator comprising socket means for engaging the stem, yoke means including opposing members for placement over the body and for engaging sides of the body with the members, means rotatably mounting the socket means to the yoke means, and actuating means secured to the yoke means and connected with the socket means for transmitting a stem turning force to the socket means and, therewith, the stem.

2. A valve actuator in accordance with claim 1 including means for biasing the members into engagement with the body sides.

3. A valve operator according to claim 1 including means for laterally moving the members towards and away from each other for adapting the actuator for use with valves of different sizes.

4. A valve actuator according to claim 1 wherein the actuating means includes a mounting plate connected to the yoke means, a self-contained reduction drive, and means for demountably securing the reduction drive to the mounting plate.

5. A valve actuator according to claim 4 including means spacing the mounting plate a substantial distance from the yoke means.

6. An actuator according to claim 4 wherein the yoke means is defined by a pair of spaced apart, opposite members, and means securing the members to a side of the mounting plate to thereby form a generally U-shaped yoke mounting the reduction drive closely adjacent the members and the valve.

7. A portable valve operator for turning a valve stem requiring a relatively large torque without subjecting pipes connected to a body of the valve to large forces to prevent pipe damage, the operator comprising: a pair of opposing, spaced apart members for placement against and engagement of opposite sides of the valve body, means interconnecting portions of the members extending beyond the body, the members having a sufficient length so that the interengaging means is spaced from the body and the stem and extends across the valve body, a socket for engaging the stem, and drive means operatively coupled with the portion of the members for turning the socket, and therewith the stem, whereby turning moments are transmitted from the drive means to the socket, the valve body, the members and hence back to the drive means without stressing the pipes connected to the valve.

8. An operator according to claim 7 wherein the interengaging means comprises a pair of spaced apart plates each having a pair of spaced apart openings, the openings in the plates being aligned with each other, wherein the members comprise elongate bars extending through the openings, and including means for biasing apart ends of the bars remote from the valve to thereby bias the bars into firm contact with the valve body sides.

9. An operator according to claim 8 wherein the openings in one of the plates are defined by holes having a slightly greater dimension than a cross section of the bars to allow relative pivotal motions of the bar in the hole when the bars are biased against the valve body sides.

10. An operator according to claim 9 including pad means secured to one side of the bars, and including means permitting repositioning of the bars in the holes by 180° so that the pads or the bars alternatively engage the valve body sides for adjusting the operator for use with valves of different sizes.

11. An operator according to claim 10 including means for removing the socket and replacing it with a socket of a different size for use of the operator with valves having differently sized stems.

12. An operator according to claim 8 wherein the drive means includes means defining a pair of substantially parallel, spaced apart edges for connection with the members, and a reduction drive unit having means complementary to the edges for placement on and removal from the edges to permit disengagement between the edge defining means, and therewith the valve side engaging members, and the reduction drive unit, respectively.

13. An operator according to claim 12 wherein the means defining the edges is closely adjacent the means interconnecting portions of the members.

14. An operator according to claim 12 including means spacing the edge defining means from the means interconnecting portions of the members for use of the valve operator with inaccessible valves such as valves buried in the ground.

15. An operator according to claim 14 wherein the means spacing the edge defining means comprises tubular means rigidly secured to the edge defining means and to at least part of the means for interconnecting portions of the members, and wherein the drive means includes a drive bar disposed within the tubular means and extending over substantially the full length thereof, means rotatably retaining the drive bar to the tubular means, and means for demountably engaging the socket and the reduction drive unit with respective ends of the drive bar.

16. An operator according to claim 15 wherein an end of the drive bar adjacent the edge defining means includes means defining a socket, and wherein the drive unit includes means for demountably engaging such socket for the transmission of rotary motions and torque from the drive unit to the drive bar.

17. An operator according to claim 16 wherein the drive unit includes means for grasping the edge defining means, the grasping means permitting relative slideable motions between the edge defining means and the drive unit for optional removal of the drive unit, and including a drive pin for demountably engaging the socket of the drive bar, and means for retracting the drive pin from such socket to enable disengagement of the drive unit and the drive bar, respectively, for removal of the drive unit from the edge defining means.

18. An adjustable portable operator for use with differently sized valves for turning relatively high torque valve stems such as encountered on infrequently operated underground valves and the like without subjecting pipes connected to the valve to large forces and possible damage from operating the stem, the operator comprising: first and second spaced apart plates each plate having a pair of openings aligned with openings in the other plate, a pair of bars extending through the openings and terminating in a grasping end spaced a substantial distance from the second plate, means permitting pivotal movements of the bars in the openings of the second plate, means adjacent the first plate for biasing apart ends of the bars opposite the grasping ends to thereby pivot the bars about axes coinciding with the openings in the second plate and grasp a valve body placed therebetween, a tubular member secured to at least one of the plates and extending a substantial distance away from the plates, a flange secured to a free end of the tubular member, the flange having opposite, parallel sides, a drive bar disposed within the tubular member and extending over substantially the full length thereof, means rotatably mounting the drive bar within the tubular member, means for interchangeably securing stem actuating, differently sized sockets to an end of the drive bar proximate the plates, a power drive unit comprising a bottom plate including a pair of opposite, generally U-shaped members dimensioned to slideably engage the flange edges and thereby demountably secure the drive unit to the flange, a reduction drive mounted to the bottom plate including a driven member, means mounting the driven member for rotation to the bottom plate, the last mentioned means including an opening, means for aligning the opening with the drive bar and means for removably securing a drive pin in the opening of the driven member, the drive pin having a length greater than the combined axial length of the drive member and the bottom plate and an end configuration for engaging the other end of the drive shaft to impart rotational movements of the driven member to the drive shaft and thereby, via the stem socket to the valve stem while torque is transmitted in a closed system from the drive unit to the stem socket, the valve body and hence to the grasping bars and back to the drive unit via the tubular means.

19. A valve operator for turning high torque valve stems of side mounted, infrequently used valves buried in the ground and the like and for with valves of varying configurations comprising: a power drive unit defined by a bottom plate including a pair of opposing, generally U-shaped brackets, a top plate spaced from the bottom plate, and a reduction drive disposed between the plates, the reduction drive including a driven member having an axial aperture, means for rotatably mounting the drive member between the plates, and a drive pin extensible through the axial aperture and past the bottom plate, the operator further including yoke means having a pair of opposite, spaced apart members for placement over the valve body and engaging sides of the valve body, a flange interconnecting the members and terminating in at least two spaced apart, generally parallel sides dimensioned to fit within the opposing channels of the bottom plate for demountably securing the drive unit to the yoke, the flange including an aperture for extending the drive pin, a stem engaging socket, and means for demountably interconnecting the socket and the drive pin to impart rotational motions of the driven member to the socket and thereby rotate the valve stem without subjecting pipes extending from the valve body to torsional forces generated by the reduction drive.

20. An operator according to claim 19 including a plurality of yoke means each having a flange with substantially identical parallel sides for engaging the drive unit and members of differing spacings for engaging sides of differently sized valve bodies.

21. A portable valve actuator for turning a valve stem without transmitting large forces to pipes extending from a body of the valve, the actuator comprising generally U-shaped yoke means including opposing members for placement against and engaging the body and means interconnecting upper ends of the members, socket means for engaging the stem rotatably mounted to the yoke means, and actuating means operatively coupled with the yoke means and the socket means for transmitting a stem turning force to the socket means and, therewith, to the stem.

22. A portable valve actuator for turning a valve stem without transmitting large forces to pipes extending from a body of the valve, the actuator comprising elongate, downwardly extending plates spaced apart a sufficient distance for engaging sides of the body with lower ends thereof, a member interconnecting upper ends of the plates, socket means disposed between the plates for engaging the stem, means coupled to the socket means, extending through an opening in the member and being rotatable relative to the member for rotation of the socket means, means for spacing the member sufficiently from the body and the stem so that it extends thereacross, and means operatively coupled with the member and the socket means for transmitting a stem turning force to the socket means and, therewith, to the stem without from the valve body.

23. A portable valve operator for turning a valve stem requiring a relatively large torque, the valve having a body mounting the stem and means for connecting the body to a pipe, the operator comprising: a pair of opposing, elongate spaced apart plate means for placement against and engagement of opposite sides of the valve body, the plate means having a sufficient length so that ends thereof extend above the valve body and the stem, means interconnecting portions of the plate means extending beyond the body, the interconnecting means extending across the valve and the stem at a point spaced thereabove, a socket for engaging the stem, and drive means operatively coupled to both the interconnecting means and the socket for turning the socket, and therewith the stem, and for forming a closed power transmitting system between the socket, the valve, the plate means and the interconnecting means so that at most only minor forces are applied to the pipe even when a relatively large stem operating torque is exerted to the stem.

* * * * *

PO-1050
(5/69)

UNITED STATES PATENT OFFICE
CERTIFICATE OF CORRECTION

Patent No. 3,768,775   Dated Oct. 30, 1973

Inventor(s) Monte B. Archer

It is certified that error appears in the above-identified patent and that said Letters Patent are hereby corrected as shown below:

Column 9, line 22, claim 22, before "from", please insert --transmitting significant forces to pipes extending--.

Signed and sealed this 16th day of April 1974.

(SEAL)
Attest:

EDWARD M.FLETCHER,JR.
Attesting Officer

C. MARSHALL DANN
Commissiioner of Patents